June 15, 1937.  H. M. JONES  2,084,089
PRESSURE GAUGE
Filed May 9, 1936
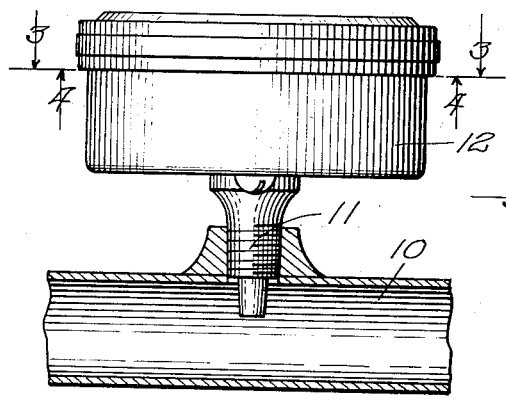
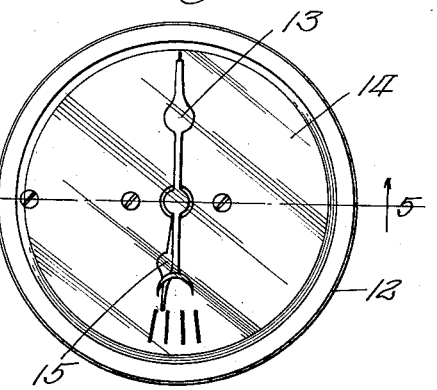
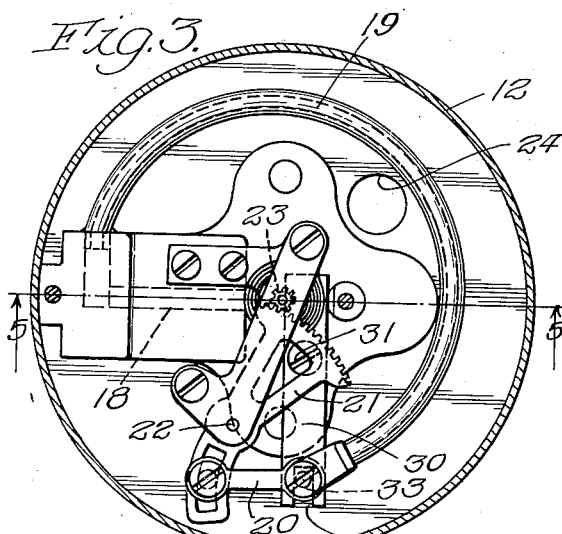
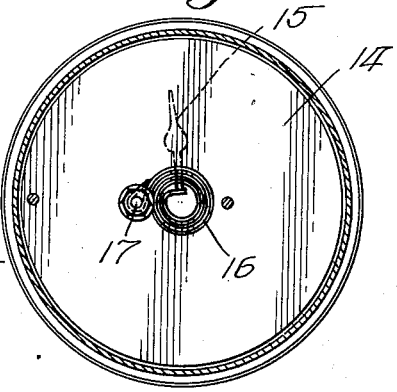
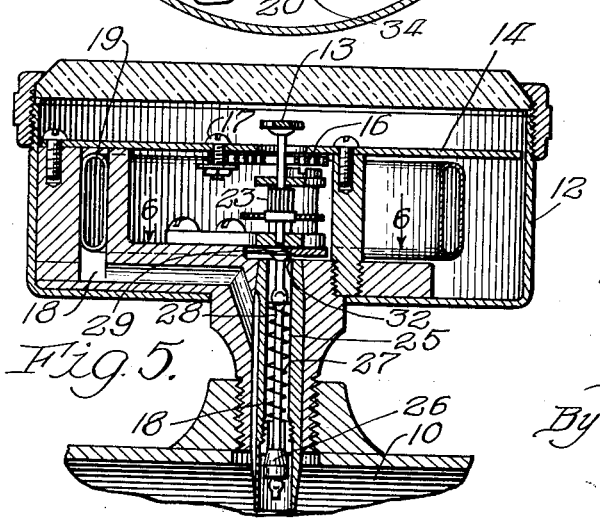
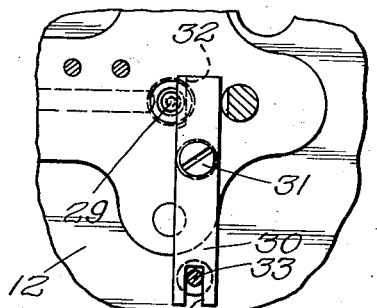
Inventor:
Horry M. Jones,
By Dyrenforth, Lee, Chritton & Wiles,
Attys.

Patented June 15, 1937

2,084,089

UNITED STATES PATENT OFFICE 2,084,089

PRESSURE GAUGE

Horry M. Jones, Chicago, Ill.

Application May 9, 1936, Serial No. 78,941

5 Claims. (Cl. 73—109)

This invention relates to a gauge for measuring pressure and more particularly to a pressure gauge adapted to be used with a measuring tank of the type shown in my earlier United States Patent No. 1,474,904, dated November 20, 1923.

The pressure gauge of my present invention is especially adapted for measuring the amount of oxygen to be released into the breather bag of a device for measuring the amount and rate of oxygen consumption by a human being in the breathing process.

One of the features of my invention is to provide a pressure gauge that, when used in conjunction with a measuring tank of predetermined volume, measures out a predetermined desired volume of oxygen or other gas at standard conditions, said gauge automatically correcting for temperature variations.

Another feature of my invention is a protective device for the gauge adapted to release the pressure on the actuating member thereof when said pressure rises above a safe value within the range of the gauge.

Other objects and advantages will be apparent from the following specification and the drawing, in which—

Fig. 1 is a side elevation of the gauge; Fig. 2 is a top plan view thereof; Fig. 3 is a horizontal view, partly in section, along the line 3—3 of Fig. 1; Fig. 4 is a bottom plan view of the dial, along the line 4—4 of Fig. 1; Fig. 5 is a vertical sectional view along the line 5—5 of Fig. 3; and Fig. 6 is a fragmentary sectional view along the line 6—6 of Fig. 5.

Where a source of fluid or gas under high pressure, such as compressed oxygen, is available, it is frequently desirable to measure out a certain volume of the gas at standard conditions. Since, within the range in which the gas laws are applicable, pressure and volume have a definite relationship, the desired volume of gas at standard conditions may be obtained by admitting gas to a tank or measuring chamber to a predetermined pressure. The pressure volume relationship is disturbed, however, by temperature variations. Moreover, where a source of gas under high pressure is used, it is desirable to protect the gauge from exposure to a pressure which might otherwise be sufficient to damage it.

The present invention comprises a pressure gauge having an indicator needle actuated in the usual manner by admission of gas under pressure to a tubular driving member, but a secondary indicator needle is provided, actuated by a temperature responsive coil, to compensate for temperature variations. The gauge is also provided with an automatically operated vent or pressure releasing means which acts when the pressure admitted to the gauge exceeds a predetermined safety point.

In the particular embodiment of this invention disclosed herewith a measuring tank or chamber 10 of definite volume has mounted therein the stem 11 of a pressure gauge 12. This gauge is provided with a main or pressure reading indicator needle 13, concentrically located with respect to the dial 14, and a second indicator needle 15, which needle cooperates with the first mentioned needle to indicate a desired pressure reading. This second indicator is also concentrically mounted both with respect to the dial 14 and the first needle 13, and is carried by a temperature responsive means here shown as a bi-metal coil 16 mounted immediately beneath the face of the dial 14 by the screw 17.

Actuating means responsive to changes in the pressure of the fluid to which the gauge is exposed is provided. Fluid under pressure in the measuring chamber 10 passes through the narrow opening 18 in the stem of the gauge 12 and enters the tube 19. Pressure in this tube 19 tends to straighten it out, and its resulting motion acts through the connecting link 20 to drive the rack 21, pivoted at 22, which rack cooperates with the pinion 23 on the shaft of the indicator needle 13. Motion of the link 20 caused by expansion of the tube 19, is thus multiplied and transmitted to the indicator needle to cause it to rotate across the face of the dial.

The position of the second indicator needle 15 is pre-set, in accordance with the size of the measuring chamber 10, the volume of gas desired at standard conditions, and the rate of movement of the needle 13 in comparison with pressure changes, so that the indicator needle 13 registers with the second indicator 15 when the desired amount of gas is present in the measuring chamber 10. The needle 15, of course, varies its position in accordance with changes in temperature existing within the apparatus, and the temperature responsive means or bi-metal coil 16 is made of a length such that movement of the needle 15 coincides with changes in the pressure resulting from the aforesaid temperature variations. That is, if the temperature of the room rises to a point such that the pressure of the desired volume of gas within the measuring chamber would be five per cent (5%) higher than would be the case at standard conditions, the second indicator 15 moves so that the pressure registration or pressure reading point is a corresponding five per cent (5%) higher than used. Thus it is only necessary for the operator to admit oxygen to the measuring chamber 10 until the indicator needle 13 registers with the second indicator needle 15, and the desired volume of gas at standard conditions, automatically compensated for the temperature differential from 0° C., will then be present in the measuring chamber 10.

Means are also provided for protecting the gauge against exposure to a high pressure which might otherwise rupture the pressure or actuating tube 19, or otherwise injure the mechanism of the gauge. This comprises a vent, normally closed, which is opened when the gauge is exposed to fluid pressure substantially higher than that which it is designed to measure. The casing of the gauge 12 is provided with a vent hole or opening to atmosphere 24, and a passage 25 is provided through the stem of the gauge connecting the measuring chamber 10 with the vent opening 24. This passage is normally closed by a valve member 26 seated therein and held in place by a spring 27. The valve member 26 is carried by a shaft 28 extending up through the passage and terminating in a projection 29 at the top thereof. A lever or protective member 30 is pivotally mounted at 31 and is provided with an inclined face adjacent to, but normally out of, contact with the projection 29. This lever 30 is also actuated by the link 20, and thus by the pressure tube 19, through a pin 33 engaged by a slot 34 in said lever. The lever is so mounted with relation to the projection 29 that throughout the normal range of operation of the pressure gauge the inclined face 32 does not contact the said projecting member 29. When the pressure to which the gauge is exposed is too high, however, and the pressure tube 19 springs out beyond the normal range of operation, the inclined face 32 of the lever 30 rides up over the projecting member 29 of the valve carrying shaft or stem 28 and depresses said stem, unseating the valve member 26 and permitting the fluid in the measuring chamber 10 to pass up through the member 25 and vent to atmosphere through the opening 24 in the casing of the gauge 12.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A pressure gauge of the character described adapted to cooperate with a tank to measure a desired volume of gas at standard temperature, including: an indicator needle; actuating means for said indicator needle, said means including a pressure tube adapted to have said gas admitted thereto; a temperature responsive means carrying a second needle with which said indicator needle is adapted to register to indicate a predetermined volume of gas, said second needle being concentrically mounted with respect to said indicator needle and moved by said temperature responsive means sufficient to compensate for variations in pressure of said predetermined desired volume of gas as a result of variations in temperature.

2. A pressure gauge of the character described, including: an indicator; actuating means for said indicator, said means being responsive to changes in pressure in the fluid admitted to said gauge; valve means for venting said fluid to atmosphere, said valve means being normally closed; and means driven by said actuating means for opening said valve when the pressure of said fluid exceeds a predetermined amount.

3. A pressure gauge of the character described, including: an indicator; actuating means for said indicator, said means including a pressure tube responsive to changes in the pressure of a fluid admitted thereto; a passage adapted to vent said fluid to atmosphere; a valve normally closing said passage; and means for opening said valve when said pressure exceeds a predetermined amount, said means being driven by said pressure tube.

4. A pressure gauge of the character described, including: an indicator; actuating means for said indicator, said means including a pressure tube having one end thereof movable in response to changes in pressure of a fluid admitted thereto; a passage adapted to vent said fluid to atmosphere; a spring pressed valve normally closing said passage; and a lever having one end thereof driven by the movable end of said pressure tube and the other end thereof adapted to open said valve against said spring, whereby fluid in said gauge is vented to atmosphere when the pressure thereof exceeds a predetermined amount.

5. A pressure gauge of the character described adapted to cooperate with a tank to measure a desired volume of gas at standard temperature, including: an indicator needle; actuating means for said indicator needle, said means being responsive to changes in pressure applied thereto; a second needle with which said indicator needle is adapted to register to indicate a predetermined desired volume of fluid; and temperature responsive means for moving said second needle to compensate for variations in the pressure of said fluid in said tank resulting from variations in the temperature thereof, said second needle and temperature responsive means being concentrically mounted with respect to said indicator needle.

HORRY M. JONES.